United States Patent [19]

Caffy et al.

[11] 4,364,911

[45] Dec. 21, 1982

[54] METHOD FOR TREATING THE RESIDUE FROM THE PRODUCTION OF PHOSPHOROCHLORIDOTHIONATES

[75] Inventors: Russell B. Caffy, Mt. Pleasant, Tenn.;
Mark S. Carron, Spring Valley, N.Y.;
Robert W. Hull, Mt. Pleasant, Tenn.;
Pawan K. Jain, Norwood, N.J.;
Harold S. Mickley, Westport, Conn.

[73] Assignee: Stauffer Chemical Company, Westport, Conn.

[21] Appl. No.: 78,640

[22] Filed: Sep. 26, 1979

[51] Int. Cl.³ .................... C01B 15/16; C01B 25/26; C01B 17/00
[52] U.S. Cl. ................................ 423/317; 423/567 R
[58] Field of Search .............................. 423/317, 567

[56] References Cited

U.S. PATENT DOCUMENTS 3,956,462  5/1976  Heymer et al. ..................... 423/317

FOREIGN PATENT DOCUMENTS 2617812  4/1976  Fed. Rep. of Germany.

*Primary Examiner*—O. R. Vertiz
*Assistant Examiner*—Gregory A. Heller
*Attorney, Agent, or Firm*—Vivienne T. White

[57] ABSTRACT

The invention pertains to a method of treating the distillation residue from the production of phosphorochloridothionates on a continuous or semi-continuous basis. The method comprises, agitating the residue with water to form a slurry which is storable, or pumpable at controlled rates to hydrolyzers for continuous or semi-continuous hydrolysis. The disclosed method, in addition to producing usable byproducts such as sulfur, phosphoric acid and hydrochloric acid also in contrast to prior art methods, significantly decreases fuel consumption and reduces the size and capacity of the facilities utilized to abate the emission of odorous gases to the atmosphere.

6 Claims, 2 Drawing Figures

FIG. I

METHOD FOR TREATING THE RESIDUE FROM THE PRODUCTION OF PHOSPHOROCHLORIDOTHIONATES

BACKGROUND OF THE INVENTION

1. Field of the Invention

The invention in general is directed to a method for treating the distillation residue from the production of dialkyl and diaryl (substituted and unsubstituted) phosphorochloridothionates.

2. Prior Art

Phosphorochloridothionates are compounds of the structure:

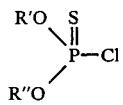

where R' and R" are the same or independently selected hydrocarbon radicals having 1–8 carbon atoms such as alkyl, aryl, alkaryl and cycloalkyl radicals.

In particular, the invention is directed to a method of treating the distillation residue from the production of dimethyl or diethyl phosphorochloridothionate.

The distillation residue formed when phosphorochloridothionates are produced, as is produced by the method disclosed in U.S. Pat. No. 3,089,890 incorporated herein by reference, is essentially comprised of a plastic mass of undissolved sulfur, other undissolved compounds and dissolved organophosphorous compounds. The distillation residue, which can be disposed of by hydrolysis on a batch basis has a highly offensive odor and is, in addition, thermally unstable. Storage of the distillation residue for any appreciable time has not been possible, as it generates problems associated with the handling of a thermally unstable, tarry mass. This problem is especially critical when diethyl phosphorochloridothionate is produced.

Presently when diethyl phosphorochloridothionate is prepared on a batch basis, the distillation residue resulting therefrom is decomposed by draining it into cold agitated water in a hydrolyzer, and heating the mixture slowly to a temperature of from 90°–120° C. By this process decomposition gases are produced at very uneven rates. During the peak rates of gas production, the odorous decomposition gases produced require the use of large volumes of air and fuel to prevent the odorous gases from escaping from the air swept hydrolyzers and abatement facilities into the atmosphere causing severe odor problems and concomitant hazardous working environment. The decomposition gases so produced, e.g. HCl, $C_2H_5OH$, $C_2H_5SH$, $H_2S$, $C_2H_5Cl$, $CS_2$, $C_2H_5S_xC_2H_5$, are then burnt in an incinerator at from about 750° C.–800° C. This prior art method of treating the distillation residue results in high fuel consumption, and therefore, high fuel cost because of the large volumes of air which must be pumped through the hydrolyzers and the incinerators.

German Patent Application No. P 2617812, filed Apr. 23, 1976 discloses a method for treating the residue from the production of dialkyl thiophosphoric acid chloride. The method comprises, placing the residue in alkalized water, having a temperature of about −10° C. to about 50° C. and a pH of at least 10 in the resulting mixture, and contacting the aqueous phase and/or solid phases of the mixture formed therein with nitric acid at an elevated temperature and at a pH of below 3, to convert the residue into fertilizer and/or crystalline sulfur.

Currently, there is no disclosed method for storing the thermally unstable distillation residue in a form which will allow for its subsequent hydrolysis in controlled amount, or for continuously or semi-continuously hydrolyzing the residue immediately after it is produced. Presently, during the production of phosphorochloridothionates by the batch process, the thermally unstable distillation residue is transferred during the process into a product still and from there the plastic mass is transferred to a hydrolyzer and immediately hydrolyzed in the manner detailed above, or it is maintained in the product still at a temperature of about 70° C. for subsequent hydrolysis. No means, therefore, is provided for controlling the amounts of the plastic mass being hydrolyzed at any specific time.

SUMMARY OF THE INVENTION

It is an object of this invention to provide a process whereby the distillation residue from the production of phosphorochloridothionates can be converted to a form which will render it hydrolyzable in controlled amounts.

A further object of this invention is to provide for the semi-continuous or continuous hydrolysis of the distillation residue without the attendant disadvantages currently experienced when the residue is hydrolyzed on a batch basis.

It is also a further object of this invention to provide a means for storing the distillation residue in a form which renders it amenable to controlled, semi-continuous or continuous hydrolysis.

Further objects of the invention will become apparent from the following more detailed description taken in conjunction with the appended drawings.

The method of this invention provides a means for the semi-continuous or continuous hydrolysis of the distillation residue in a controlled, uniform manner so as to eliminate the problems associated with its decomposition on a batch hydrolysis basis as disclosed in the prior art.

The method of this invention comprises treating the distillation residue from the production of phosphorochloridothionates in a continuous or semi-continuous manner by introducing the residue into sufficient agitated water to form a pumpable and storeable slurry having a temperature below that necessary to cause decomposition of the residue, and transferring the slurry in controlled amounts to a hydrolyzing zone for hydrolysis. The distillation residue treated in the manner disclosed can be stored for a reasonable period of time, with or without further agitation prior to hydrolysis. Depending on the specific phosphorochloridothionate yielding the residue the formed slurry can be maintained at temperatures of from 50° C. up to 80° C., without spontaneous hydrolysis occurring.

DETAILED DESCRIPTION OF THE INVENTION

Water either neutral, acidic or alkaline, may be utilized in forming the slurry. The ratio of residue to water should not be greater than about 4:1.

In accordance with the invention, there is provided a method of treating the tarry or plastic-like distillation residue (hereinafter residue) from the production of phosphorochloridothionates having the formula:

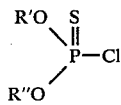

wherein R' and R" are the same or independently selected hydrocarbon moieties having from 1–8 carbon atoms and produced as disclosed in U.S. Pat. No. 3,897,523 and in U.S. patent application Ser. No. 838,685, filed Oct. 3, 1977, now U.S. Pat. No. 4,185,053, both commonly assigned herewith and both incorporated herein by reference. The process of this invention allows for the decomposition of the residue into usable byproducts, in a controlled manner, without the attendant unfavorable peak emissions of offensive gases, or the high fuel cost associated with the present batch hydrolysis method. The prior art method involves hydrolyzing the entire residue product in a single step (due to its plastic form) from the batch distillation of the thiophosphoric acid chloride.

Unexpectedly it was discovered that the residue when introduced into cold agitated water, and sufficiently agitated thereafter, would form a stable slurry in which the solids would not settle to reform the plastic mass (when agitation ceased) and which could be later hydrolyzed in controlled amounts in a continuous or semi-continuous manner.

The practice of the present invention comprises hydrolyzing the residue in a continuous or semi-continuous manner by introducing the residue into agitating water prior to placing the residue into hydrolyzers, thereby forming the slurry which can be decomposed in controllable amounts.

Figure 1:
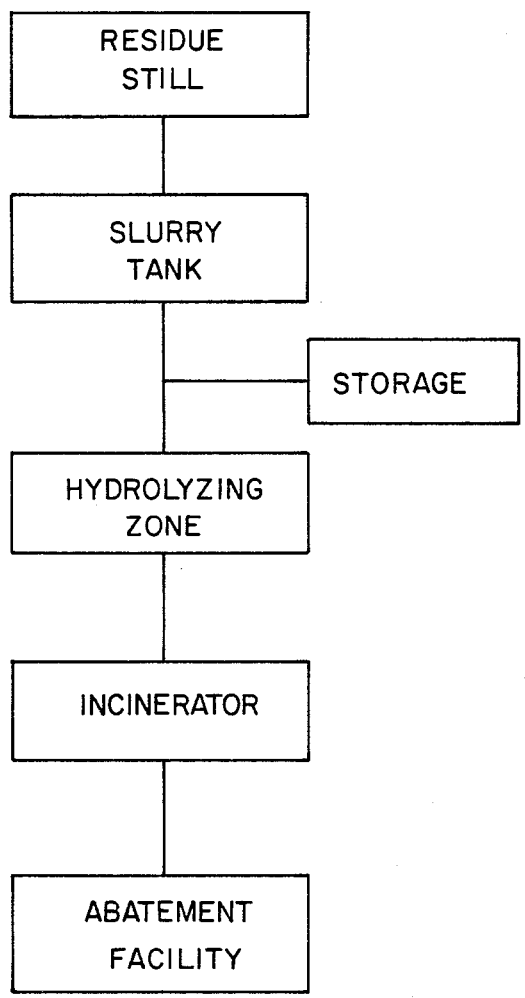
FIG. 1 is a flow diagram of the disclosed invention.
Figure 2:
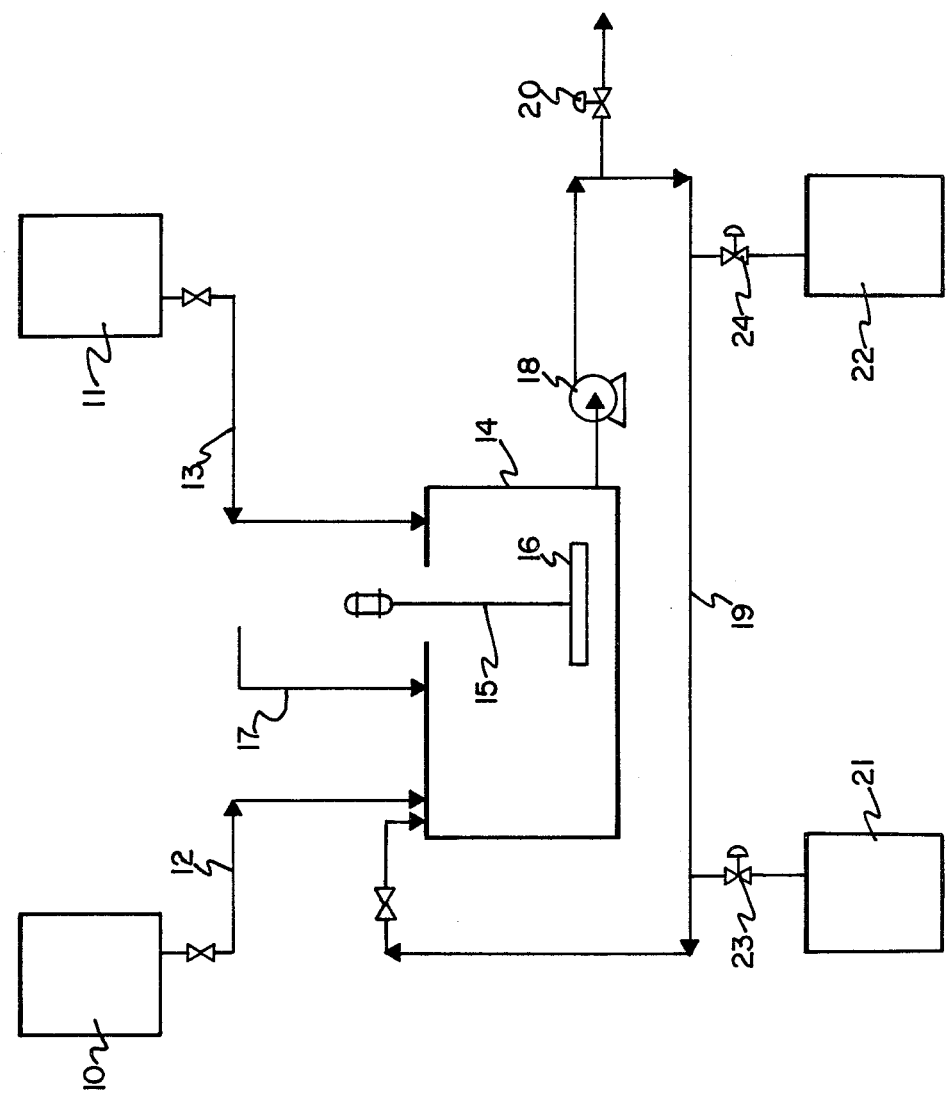
FIG. 2 illustrates an embodiment of the present invention.

FIG. 1 schematically illustrates the process for treating the residue in accordance with this invention. FIG. 2 is described by reference to the numbers to illustrate the flow of the residue from product stills to slurry tanks where it is agitatively combined with water preferably cold water having a temperature of less than 50° C., most preferably below 40° C., and in a ratio of residue to water of not greater than about 4:1 preferably 2:1. The process further comprehends storage of the residue with or without continued agitation or heat transfer in the slurry tanks, or in other storage facilities to which the slurry can optionally be transferred.

The process more desirably comprehends conveying the slurry to hydrolyzers in a controlled, uniform manner for its semi-continuous or continuous decomposition.

In a more detailed description with reference to the drawing, there is depicted product tanks or stills 10 and 11 which contain the residue from the production of phosphorochloridothionates as is for example, produced by the method disclosed in U.S. Pat. Nos. 3,089,890, 3,897,523 and U.S. Application Ser. No. 838,685 mentioned above, now U.S. Pat. No. 4,185,053, all of which are incorporated herein by reference.

The residue is essentially comprised of a plastic mass of sulfur, undissolved solids and dissolved organophosphorous compounds. Due to its thermally unstable characteristics, the residue is usually maintained, at a temperature below 70° C., in product stills to reduce the decomposition of the material. The residue, in the practice of this invention, is transferred through lines 12 and 13 to a slurry tank 14 containing agitating means such as an agitator 15, and an impeller blade 16 for agitating the contents of the slurry tank. Water, either neutral, acidic or alkaline is added to the slurry tank via line 17. Advantageously, acidic waste water (obtained when jet steam ejector vacuum pump is used to remove HCl and other gases during the production of diethyl phosphorochloridothionate) can be utilized in the preparation of the slurry instead of neutral or alkaline water.

In forming the slurry, it is preferable to cause quick quenching of the residue to insure the forming of crystalline sulfur particles instead of a more plastic sulfur formed when quenching is accomplished at a slower rate. The water used should, therefore, be cold or at least less than 50° C. Further, the lower the temperature of the water the lower will be the temperature of the slurry. One having skill in the art will appreciate that the maximum allowable temperature of the slurry (to prevent premature hydrolysis and therefore decomposition of the residue) is dependent on the specific phosphorochloridothionate distillate residue being treated. The higher the molecular weight of the phosphorochloridothionate compounds being produced the higher can be the temperature of the residue-water slurry mixture formed, and conversely the lower molecular weight phosphorochloridothionate will produce distillation residues which form slurries with lower maximum allowable temperatures. The maximum allowable temperatures can range from 50° C. for the residue slurry from the production of compounds such as diethyl phosphorochloridothionates to about 80° C. for the residue slurry from the production of compounds having higher molecular weights.

In accordance with the invention, the slurry is formed by adding water to the slurry tank 14 in sufficient amounts to form a slurry having a ratio of residue to water of not greater than 4:1. The water is then agitated and the agitation is continued while the residue is drained into the tank to form the slurry characterized by a commingling of water and organics with fine particles of sulfur suspended therein.

The slurry tank desirably has affixed thereto pumping and pipe means such as 18 and 19 for removing the slurry from the tank to a storage facility (not shown) through valve 20, or to hydrolyzers 21 and 22. The means 18 and 19, for instance, utilized in this embodiment, can be a diaphragm pump 18 and a pump 19. The pump 18, comprising the means for transferring the slurry on a continuous basis through the pipe 19.

In the practice of the invention, it is also possible to store the slurry in the slurry tanks without further agitation. In such instances, the slurry will quickly settle into three distinct layers, namely, an acidic layer, an organic layer and a granular sulfur layer. These layers will commingle when agitation is resumed as the solids become resuspended to form the slurry mixture. It is of course understood, that any facility utilized for storage should be equipped with means, such as an agitator, for agitating the mixture to form the pumpable slurry, and means for removing the slurry from the storage facility for hydrolysis.

It is important to note that agitation of the residue with the water as disclosed herein will not result in the reformation of the plastic sulfurous residue when agitation is suspended, especially if the length of time during which agitation is suspended remains reasonable, (e.g., less than three days), and the temperature of the slurry remains below the maximum allowable.

In the process of the continuous or semi-continuous hydrolysis of the slurried mixture as disclosed herein, the pump 18, as previously described above, continuously recirculates the slurry (as shown in the drawing by the arrow) through line 19 when the mixture is being agitated so that the slurry can be transferred by valve means 23 and 24 to the hydrolyzers 21 and 22. As indicated above, the slurry has a very quick settling tendency and therefore the equipment utilized in the process should be designed to handle an unstable, viscous slurry, containing a high concentration of solids. It should be readily discerned from the above, that in recirculating the slurry through line 19 agitation of the slurry must be continuous since to suspend agitation will cause a settling of the solids and in turn the blockage of line 19. The combining of the residue with the water does not produce gases (hydrolysis of the residue) when the temperature is kept at or below the maximum allowable temperature. Some fuming, however, occurs which is mostly water vapor having a slight typical hydrolyzer odor. For this reason, the vessel for handling or mixing the slurry is desirably equipped with air sweeps on the surface of the slurry to vent the fumes, or closed and vented to the hydrolyzer or directly to the incinerator.

It shoyuld be evident, to one skilled in the art, that the degree of agitation necessary to cause the granular solids to suspend in the liquid and form the slurry will depend primarily on the size of the vessel, the agitating means utilized, and other parameters within the experience of one skilled in the art.

Hydrolysis of the residue in a semi-continuous or continuous manner can be accomplished by adding to the hydrolyzer a quantity of water and heating the water to 90°-100° C., and further adding thereto a quantity of phosphoric acid (obtainable as a decomposition product of the slurried residue treated in a manner as herein disclosed), and thereafter feeding the residue-water slurried mixture slowly to the hydrolyzer at a controlled, uniform rate while maintaining the hydrolyzer temperature at 100°-110° C. with heaters. The slurry feeding period can thus be varied to spread out the aqueous emissions and achieve the desired control of the gas emission rate. On completion of the feeding of the slurry, the mixture is heated at a temperature of from 110°-115° C. to decompose the residue. After completion of the heating, the mixture of the phosphoric acid and the molten sulfur is transferred from the hydrolyzers to existing equipment for further processing.

The terms continuous and semi-continuous as used herein should be understood to refer to introducing the slurry into the hydrolyzing zone without interruption (continuous), or intermittently (semi-continuous).

Of course, in either of the above defined procedures for hydrolyzing the slurry, the slurry is supplied to the hydrolyzer in a manner necessary to cause the decomposition gases to form at a controllable rate. Advantageously, the method of treating the residue from the production of phosphorochloridothionates, disclosed herein, also makes possible the use of air-tight hydrolyzers due to the ability to control the volume of decomposition gases produced per unit time.

The decomposition gases produced during hydrolysis are vented from the hydrolyzers (where air-swept hydrolyzers are used) by blowers during the process to an incinerator which will desirably utilize less air and less fuel in burning the gases produced. From the incinerator, gas containing HCl and $SO_2$ is conveyed to $SO_2$ abatement facilities which can be greatly reduced in capacity and size due to the decreased volume of gas which must be treated per unit time as a result of the process disclosed herein.

What is claimed is:

1. A method of treating distillation residue from the production of phosphorchloridothionates in a continuous or semi-continuous manner comprising introducing the residue into sufficient agitated water to form a pumpable and storeable slurry having a temperature below that necessary to cause decomposition of the residue and hydrolyzing the slurry in controllable amounts to decompose the residue and produce hydrolysis by-products comprising sulfur, phosphoric acid, and decomposition gases at controllable rates.

2. The method of claim 1 wherein the residue to water ratio of the slurry is not greater than about 4:1.

3. The method of claim 2 wherein the ratio of water to residue is preferably 2:1.

4. The method of claim 1 wherein the residue treated is derived from the production of diethyl phosphorochloridothionate.

5. The method of claim 1 wherein the residue treated is derived from the production of dimethyl phosphorochloridothionate.

6. The method of claim 4 or 5 wherein the maximum temperature of the slurry is not greater than 50° C.

* * * * *

UNITED STATES PATENT AND TRADEMARK OFFICE
CERTIFICATE OF CORRECTION

PATENT NO. : 4,364,911
DATED : December 21, 1982
INVENTOR(S) : Russell B. Caffy et al.

It is certified that error appears in the above-identified patent and that said Letters Patent are hereby corrected as shown below:

Col.5, line 35, change "shoyuld" to -- should --;

Col.5, line 52, change "aqueous" to -- gaseous -- .

Signed and Sealed this

Twenty-second Day of March 1983

[SEAL]

Attest:

GERALD J. MOSSINGHOFF

Attesting Officer

Commissioner of Patents and Trademarks